United States Patent
Bale

(10) Patent No.: US 8,556,288 B1
(45) Date of Patent: Oct. 15, 2013

(54) LOCKBOX FOR A COUPLER OF A TRAILER

(71) Applicant: Bruce H. Bale, Eugene, OR (US)

(72) Inventor: Bruce H. Bale, Eugene, OR (US)

( * ) Notice: Subject to any disclaimer, the term of this patent is extended or adjusted under 35 U.S.C. 154(b) by 0 days.

(21) Appl. No.: 13/742,544

(22) Filed: Jan. 16, 2013

(51) Int. Cl.
*B60D 1/60* (2006.01)

(52) U.S. Cl.
USPC .............................................. 280/507; 70/14

(58) Field of Classification Search
None
See application file for complete search history.

(56) References Cited

U.S. PATENT DOCUMENTS

| | | | |
|---|---|---|---|
| 3,857,575 A | 12/1974 | Lee | |
| 4,032,171 A | 6/1977 | Allen et al. | |
| 4,141,569 A | 2/1979 | Dilk | |
| 4,373,303 A | 2/1983 | Stratichuk | |
| 4,459,832 A | 7/1984 | Avrea et al. | |
| 4,538,827 A | 9/1985 | Plifka | |
| 4,577,884 A | 3/1986 | Harris | |
| 4,730,841 A * | 3/1988 | Ponder | 280/501 |
| 4,756,172 A | 7/1988 | Weaver | |
| 4,774,823 A | 10/1988 | Callison | |
| 4,836,570 A | 6/1989 | Lopez et al. | |
| 5,087,064 A | 2/1992 | Guhlin | |
| 5,094,423 A | 3/1992 | Almquist et al. | |
| 5,195,339 A | 3/1993 | Nee et al. | |
| 5,351,511 A | 10/1994 | Bernier | |
| 5,584,495 A | 12/1996 | Mason | |
| 5,700,024 A | 12/1997 | Upchurch | |
| 5,775,139 A | 7/1998 | Sellers | |
| 5,873,271 A | 2/1999 | Smith | |
| 6,070,441 A | 6/2000 | Bernstrom | |
| 6,406,052 B1 | 6/2002 | Bale | |
| 6,588,239 B1 * | 7/2003 | Johansson | 70/14 |
| 7,107,799 B1 * | 9/2006 | Marley et al. | 70/14 |

FOREIGN PATENT DOCUMENTS

GB 2126549 A 3/1984

* cited by examiner

*Primary Examiner* — Tony Winner
(74) *Attorney, Agent, or Firm* — David S. Alavi

(57) ABSTRACT

A lockbox for a coupler of a trailer comprises a bottom assembly, a top cover, and a locking mechanism. The bottom assembly includes a post mounted on a bottom panel within an interior volume defined by bottom, front, and side panels. That post is received into a socket of the coupler with the coupler received into the interior volume through an open back area. The top cover engages the bottom assembly to cover an open top area above the post; the engaged top cover prevents removal of the coupler from the post. When locked, the locking mechanism retains the top cover engaged with the bottom assembly; when unlocked, the locking mechanism enables disengagement of the top cover and removal of the coupler. The bottom assembly includes a rigid tubular member around a lower portion of the post that is rotatable around the post and obstructs access to the post.

8 Claims, 16 Drawing Sheets

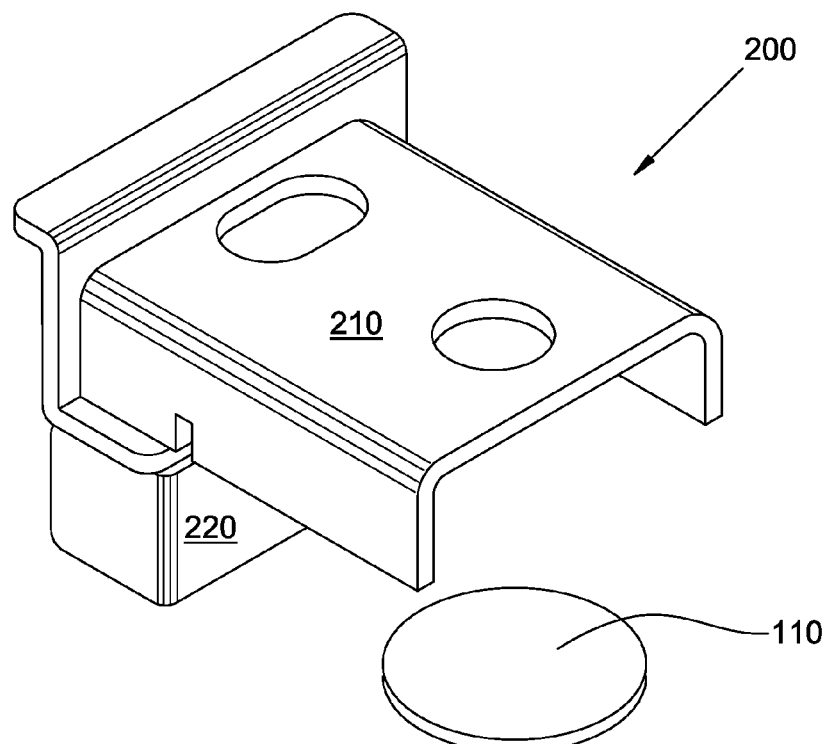
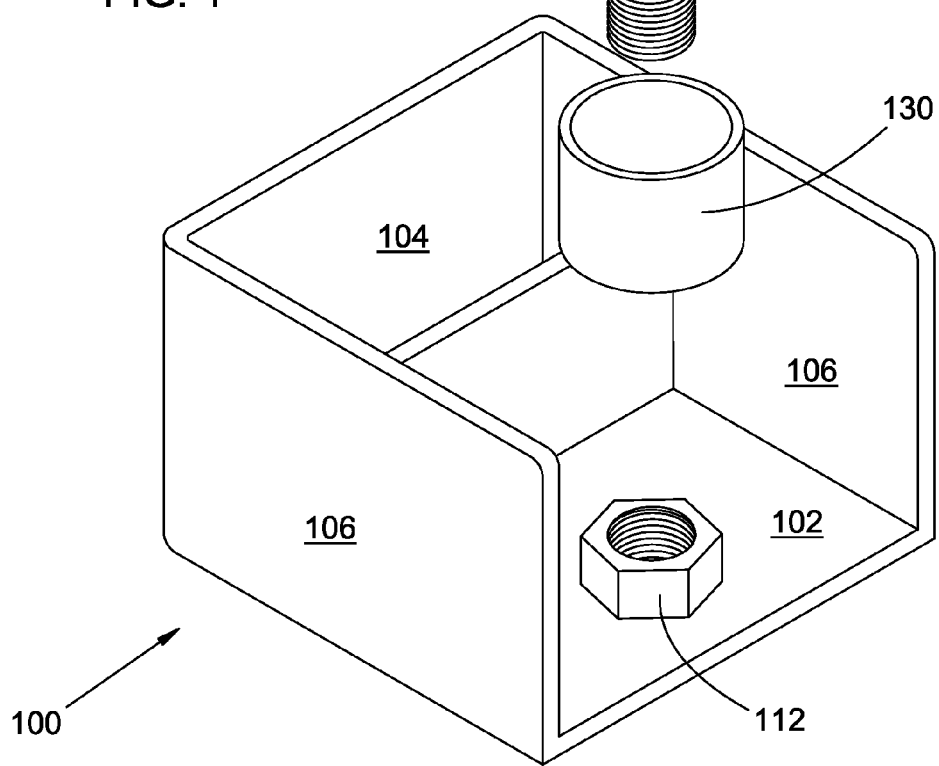
FIG. 1

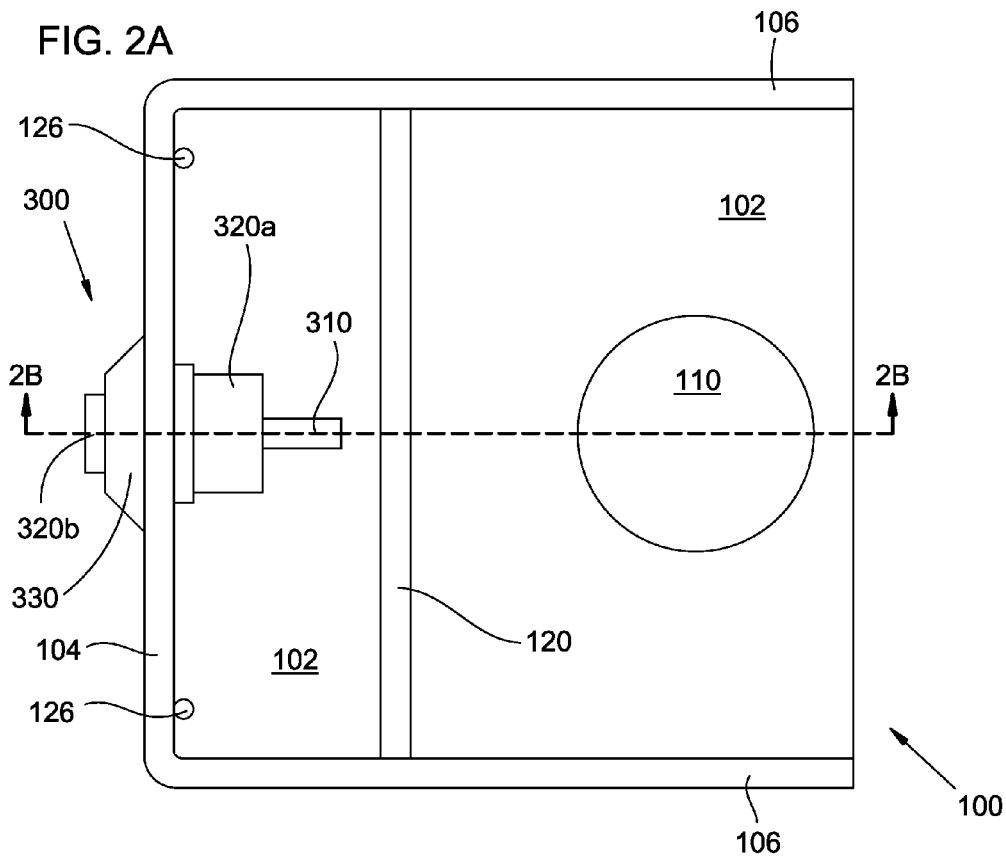
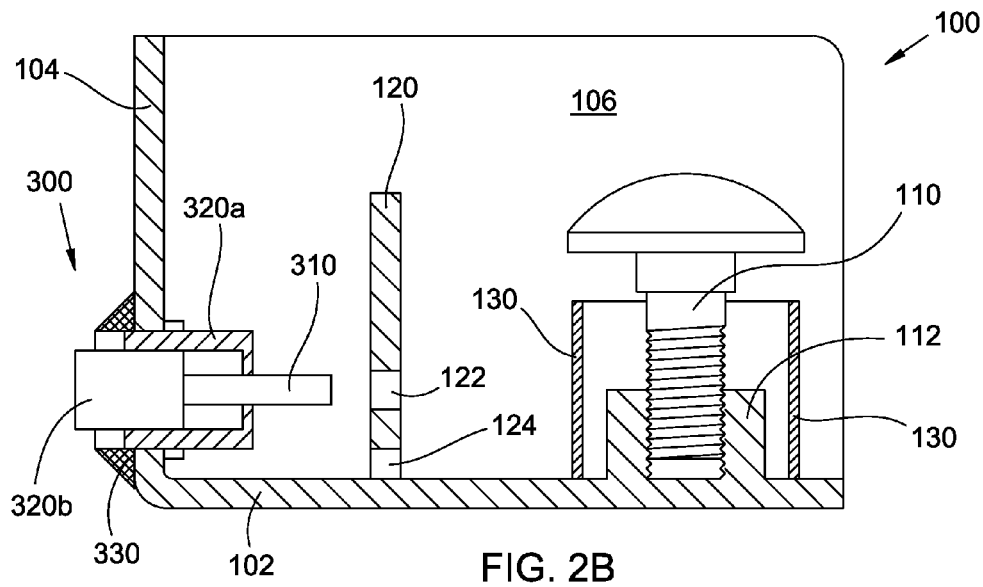

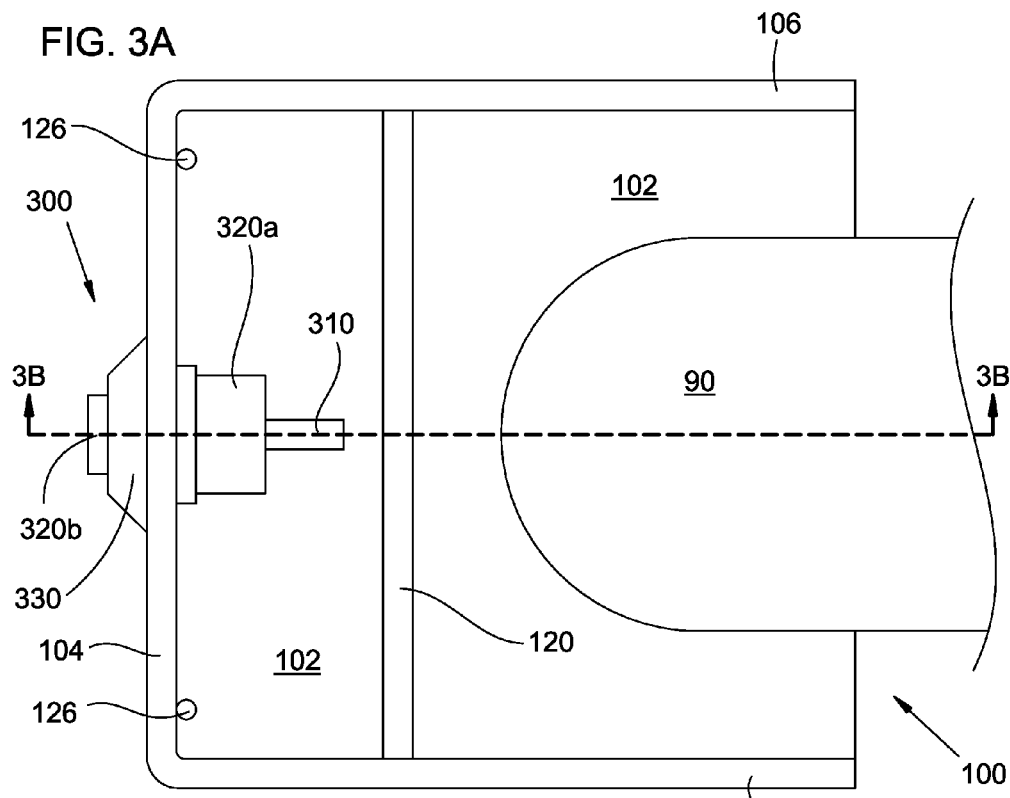
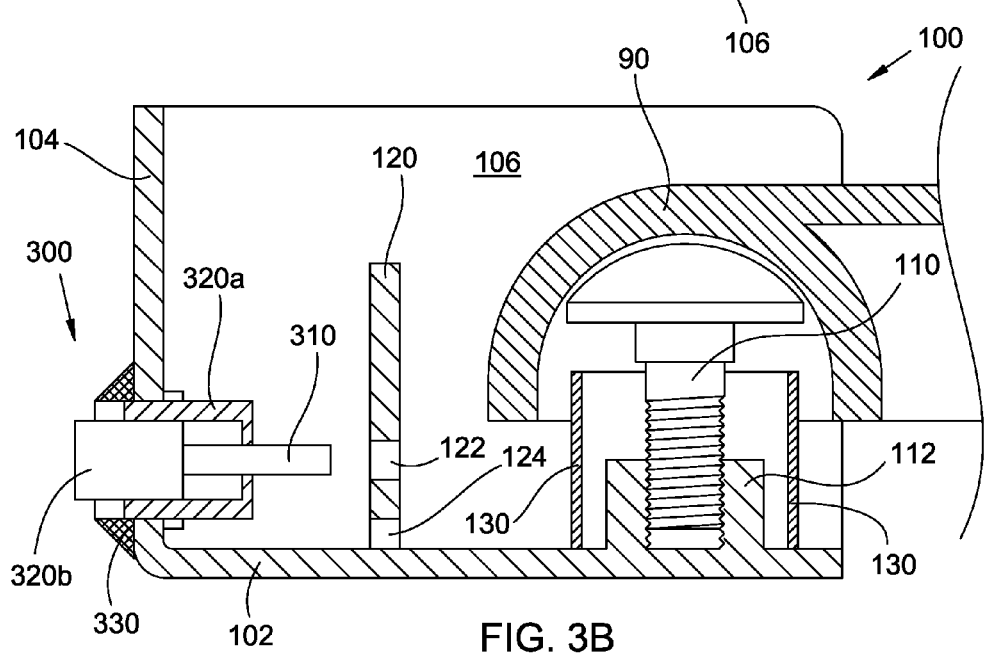

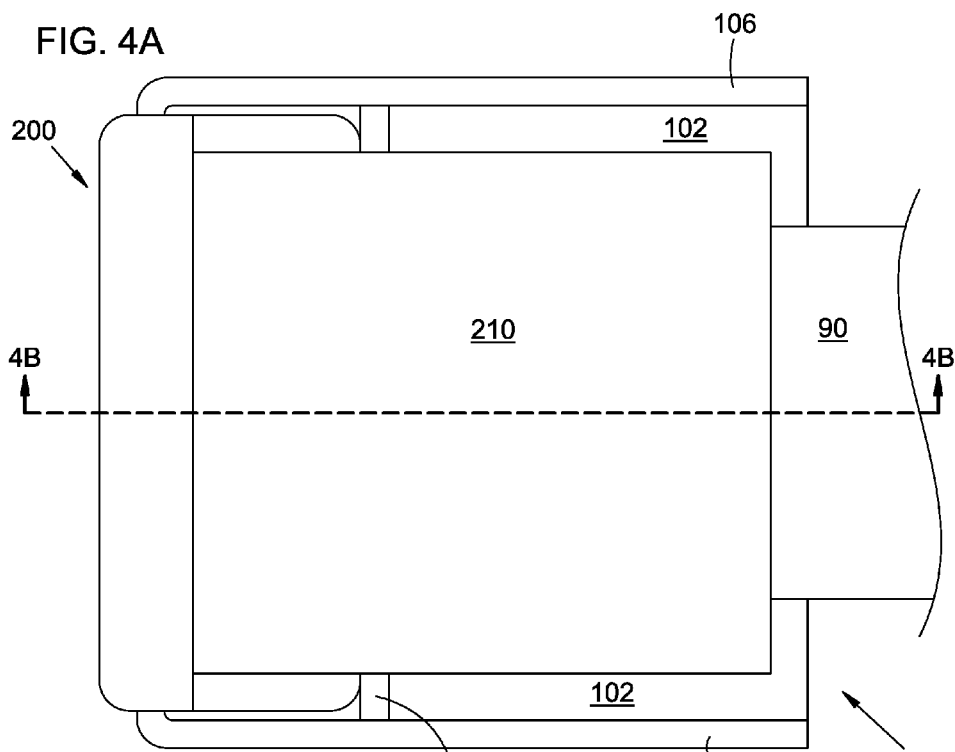
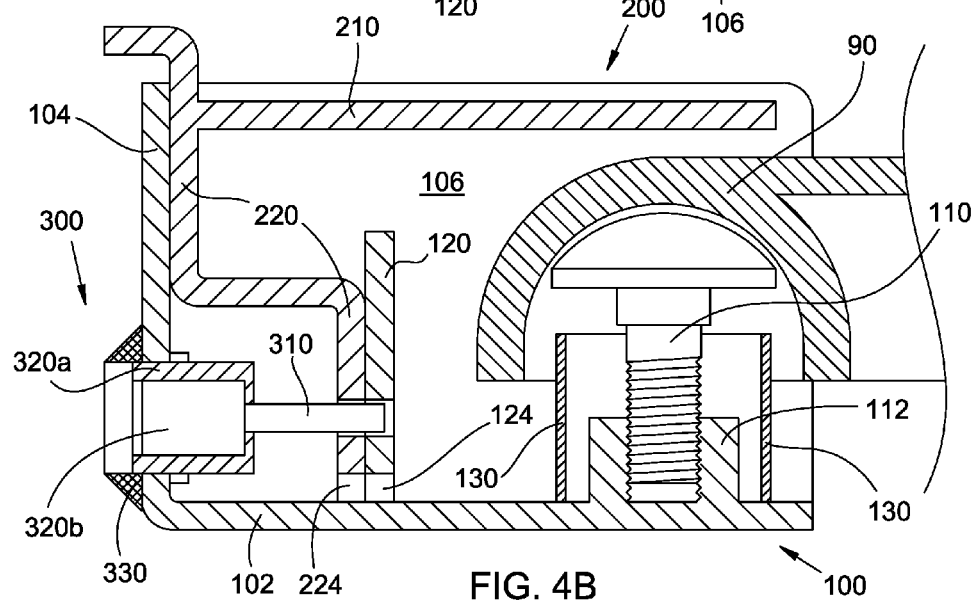

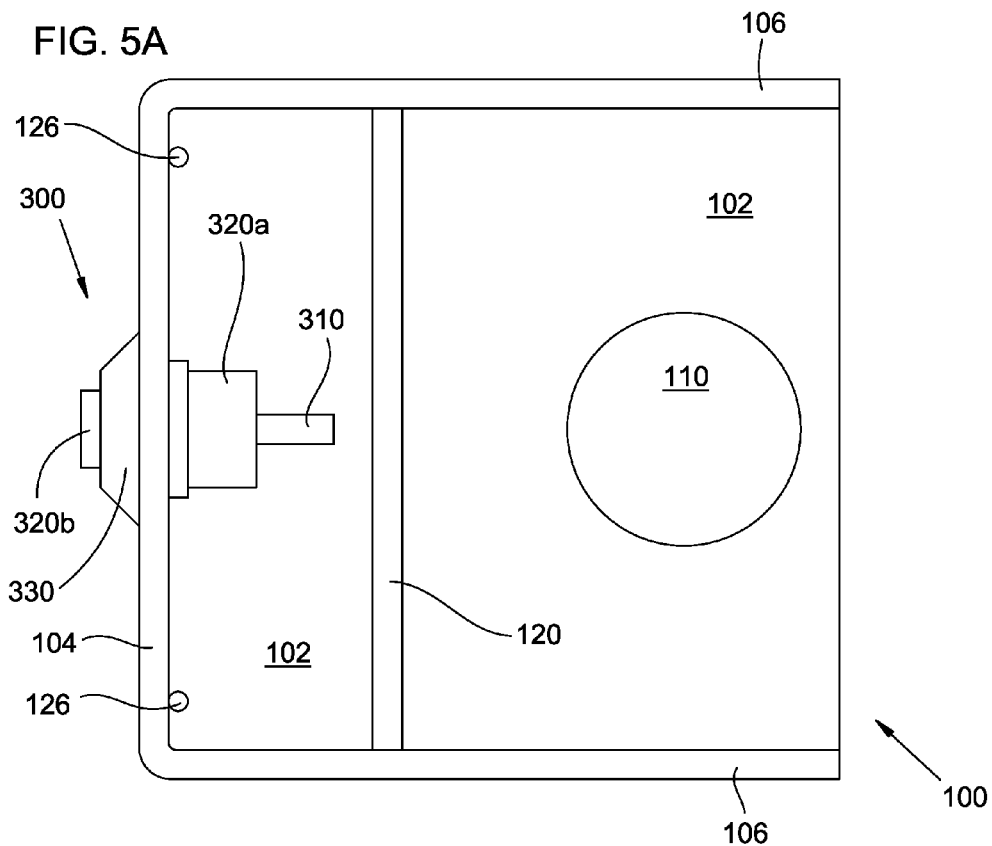
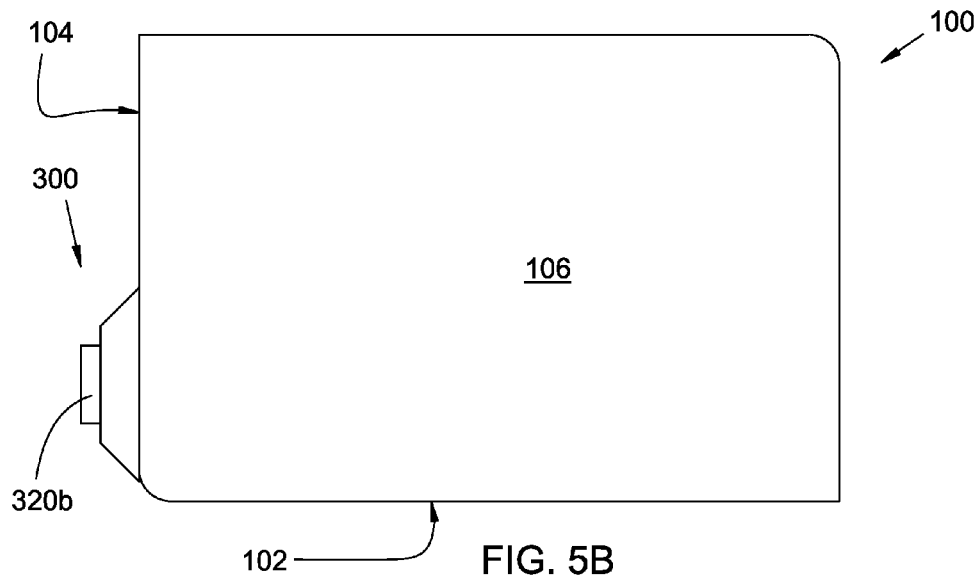

FIG. 5E
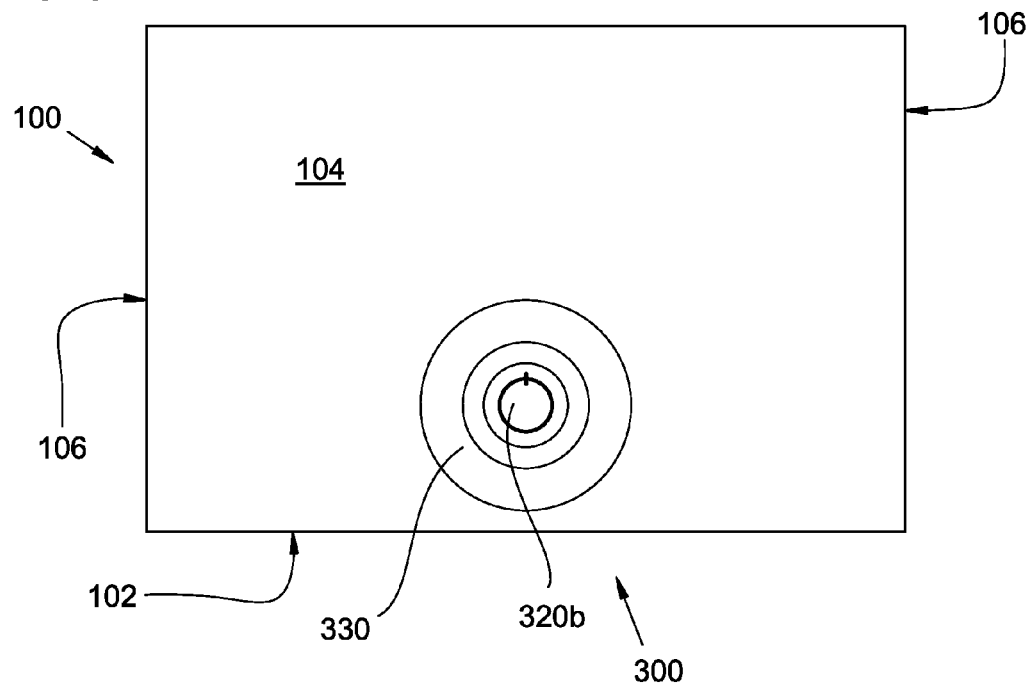
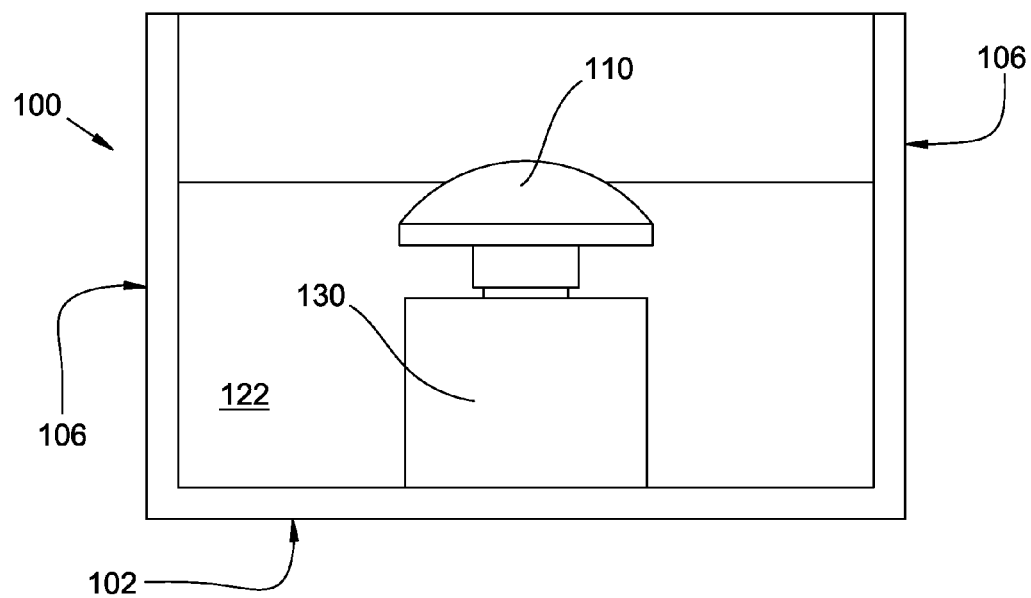
FIG. 5F

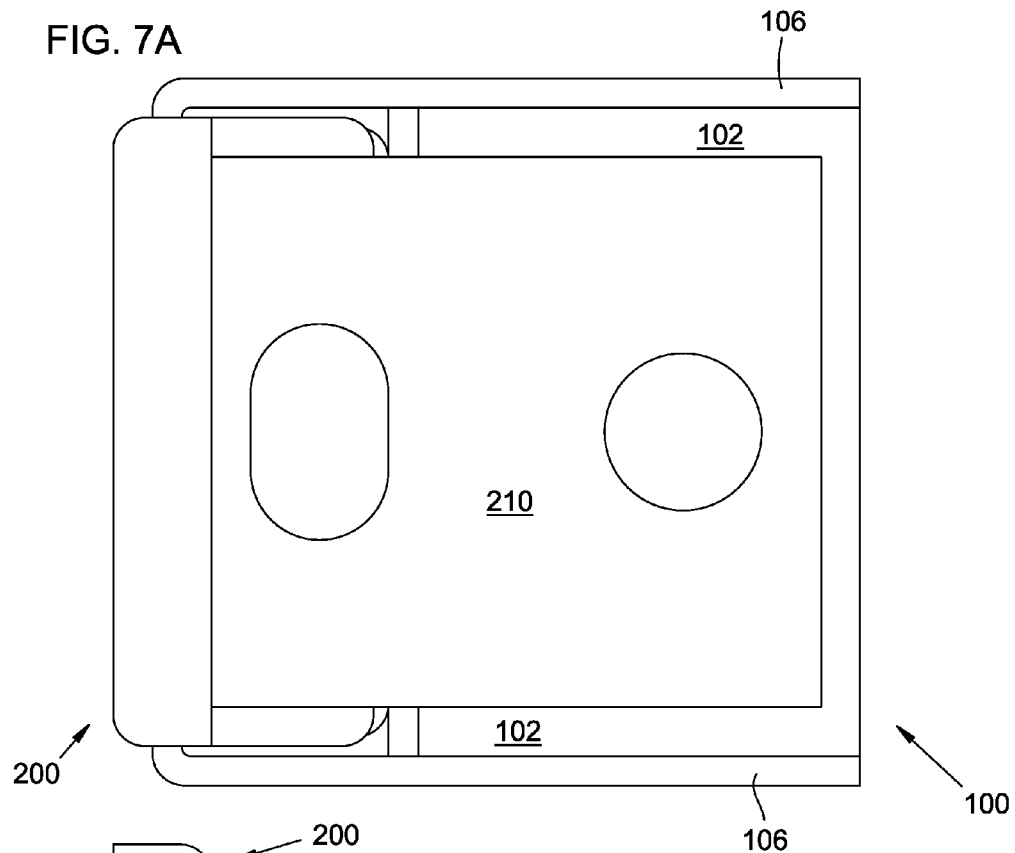
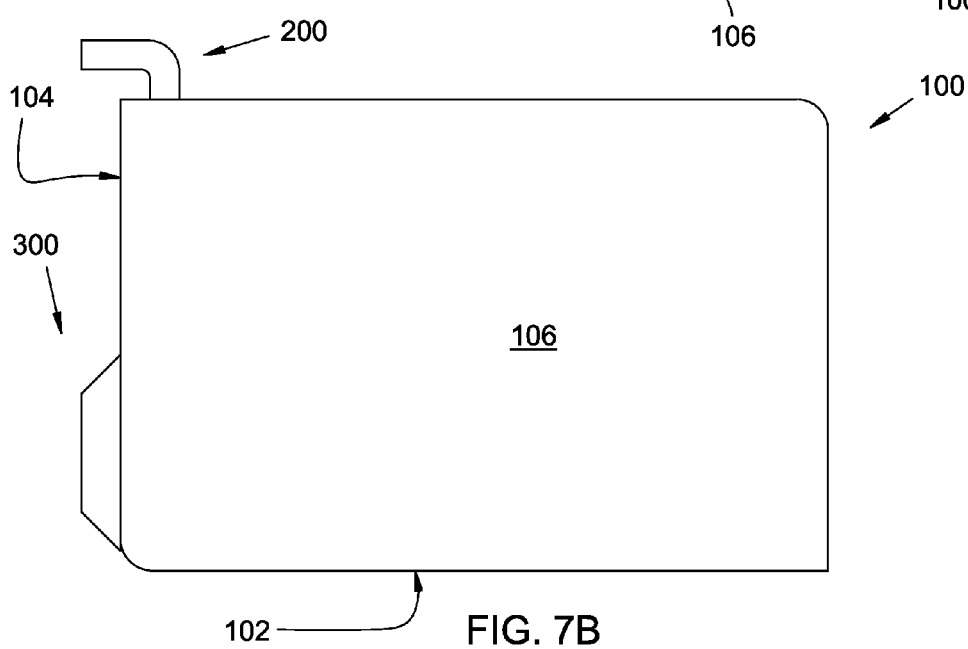

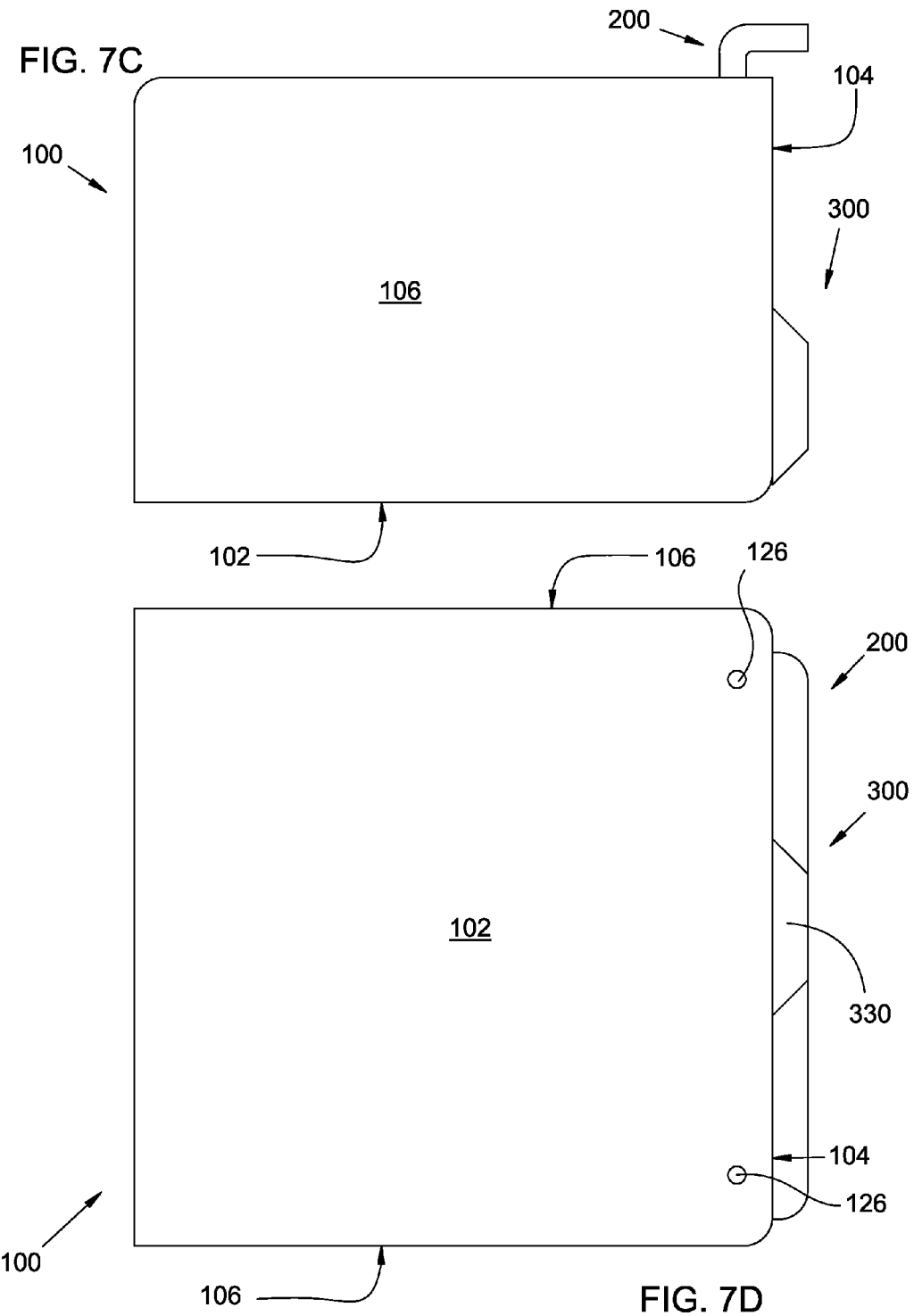

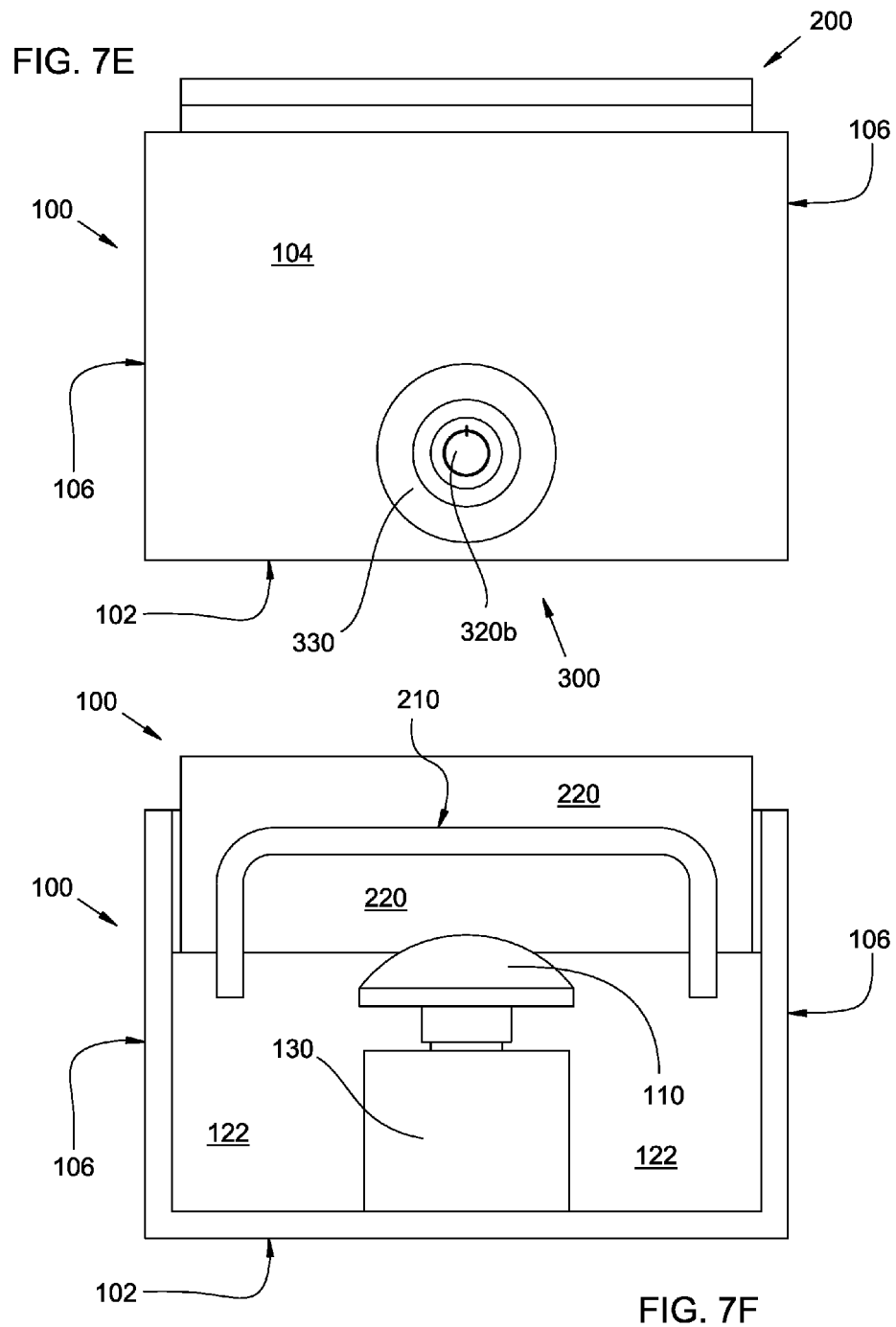

LOCKBOX FOR A COUPLER OF A TRAILER

BACKGROUND

The field of the present invention relates to trailer hitches. In particular, a lockbox is shown and described herein for securing a coupler of a trailer hitch.

A wide variety of hitching post and security devices are available for trailer couplers or hitches. Some of these are described in, e.g.:

U.S. Pat. No. 3,857,575 entitled "Security trailer hitching post" issued Dec. 31, 1974 to Lee;
U.S. Pat. No. 4,032,171 entitled "Trailer hitch locking device" issued Jun. 28, 1977 to Allen et al;
U.S. Pat. No. 4,141,569 entitled "Theft prevention device" issued Feb. 27, 1979 to Dilk;
U.S. Pat. No. 4,373,303 entitled "In-ground trailer post assembly" issued Feb. 15, 1983 to Stratichuk;
U.S. Pat. No. 4,459,832 entitled "Trailer hitch lock" issued Jul. 17, 1984 to Avrea et al;
U.S. Pat. No. 4,538,827 entitled "Ball hitch trailer lock" issued Sep. 3, 1985 to Plifka;
U.S. Pat. No. 4,577,884 entitled "Trailer hitch" issued Mar. 25, 1986 to Harris;
U.S. Pat. No. 4,756,172 entitled "Trailer lock" issued Jul. 12, 1988 to Weaver;
U.S. Pat. No. 4,774,823 entitled "Trailer hitch lock" issued Oct. 4, 1988 to Callison;
U.S. Pat. No. 4,836,570 entitled "Trailer hitch" issued Jun. 6, 1989 to Lopez et al;
U.S. Pat. No. 5,087,064 entitled "Anti-theft and safety device for a ball and socket trailer hitch" issued Feb. 11, 1992 to Guhlin;
U.S. Pat. No. 5,094,423 entitled "Trailer security device and method" issued Mar. 10, 1992 to Almquist et al;
U.S. Pat. No. 5,195,339 entitled "Security device for a trailer hitch or similar article" issued Mar. 23, 1993 to Nee et al;
U.S. Pat. No. 5,351,511 entitled "Trailer kingpin locking device" issued Oct. 4, 1994 to Bernier;
U.S. Pat. No. 5,584,495 entitled "Trailer hitch locking assembly" issued Dec. 17, 1996 to Mason;
U.S. Pat. No. 5,700,024 entitled "Coupler locking device and method" issued Dec. 23, 1997 to Upchurch;
U.S. Pat. No. 5,775,139 entitled "Trailer hitch lock" issued Jul. 7, 1998 to Sellers;
U.S. Pat. No. 5,873,271 entitled "Trailer vehicle security device" issued Feb. 23, 1999 to Smith;
U.S. Pat. No. 6,070,441 entitled "Trailer hitch security device" issued Jun. 6, 2000 to Bernstrom;
U.S. Pat. No. 6,406,052 entitled "Secure trailer hitching post" issued Jun. 18, 2002 to Bale; and
GB 2 126 549 entitled "Trailer security device" published Mar. 28, 1984 in the name of Roberts.

SUMMARY

A lockbox for a coupler of a trailer comprises a bottom assembly, a top cover, and a locking mechanism. The bottom assembly comprises a bottom panel, a front panel, and two side panels that are arranged so as to define a lockbox interior volume, an open top area, and an open back area. The bottom assembly further comprises a post mounted on the bottom panel within the interior volume. That post is arranged to be received into a socket of the coupler of the trailer with the coupler received into the interior volume through the open back area. The bottom assembly and the top cover are arranged so as to engage one another with the top cover covering at least a portion of the open top area above the post; the engaged top cover prevents removal of the coupler from the post. The locking mechanism is arranged, in a locked configuration, to retain the bottom assembly and the top cover engaged with one another and arranged, in an unlocked configuration, to enable disengagement of the top cover from the bottom assembly. The bottom assembly further comprises a substantially rigid tubular member positioned around a lower portion of the post and arranged so as to be rotatable around the post and to obstruct access to the post with the post received in the socket of the coupler of the trailer.

Objects and advantages pertaining to a lockbox for a coupler for a trailer may become apparent upon referring to the exemplary embodiments illustrated in the drawings and disclosed in the following written description or appended claims.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 is a exploded view of an exemplary lockbox for a coupler of a trailer.

FIGS. 2A and 2B are top and side cross-sectional views of the exemplary lockbox without the coupler in place or the top cover engaged with the bottom assembly.

FIGS. 3A and 3B are top and side cross-section views of the exemplary lockbox with the coupler in place but without the top cover engaged with the bottom assembly.

FIGS. 4A and 4B are top and side cross-sectional views of the exemplary lockbox with the coupler in place and the top cover engaged with the bottom assembly.

FIGS. 5A-5G are top, right side, left side, bottom, front, back, and isometric views, respectively, of the bottom assembly of the exemplary lockbox.

FIGS. 7A-7G are top, right side, left side, bottom, front, back, and isometric views, respectively, of the exemplary lockbox with the top cover engaged with the bottom assembly but without the coupler in place.

Figure 5C:
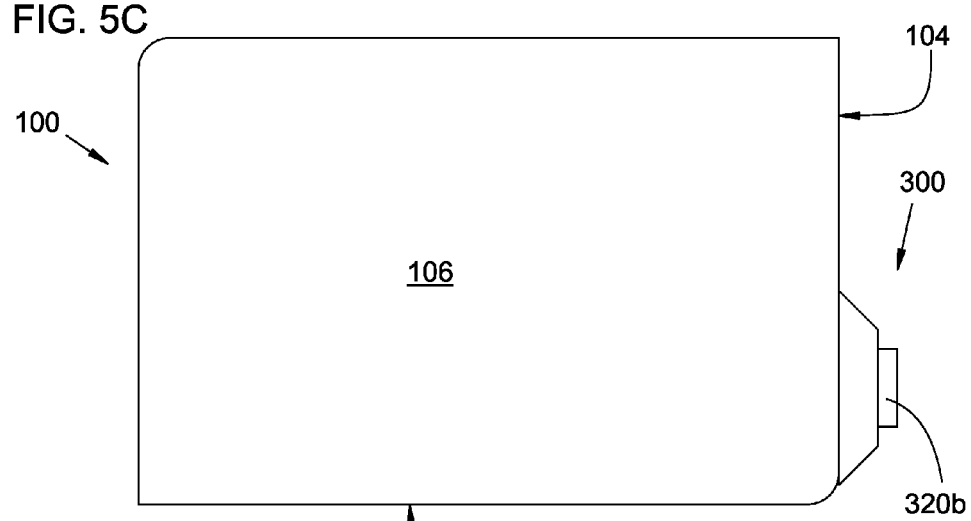
Figure 5D:
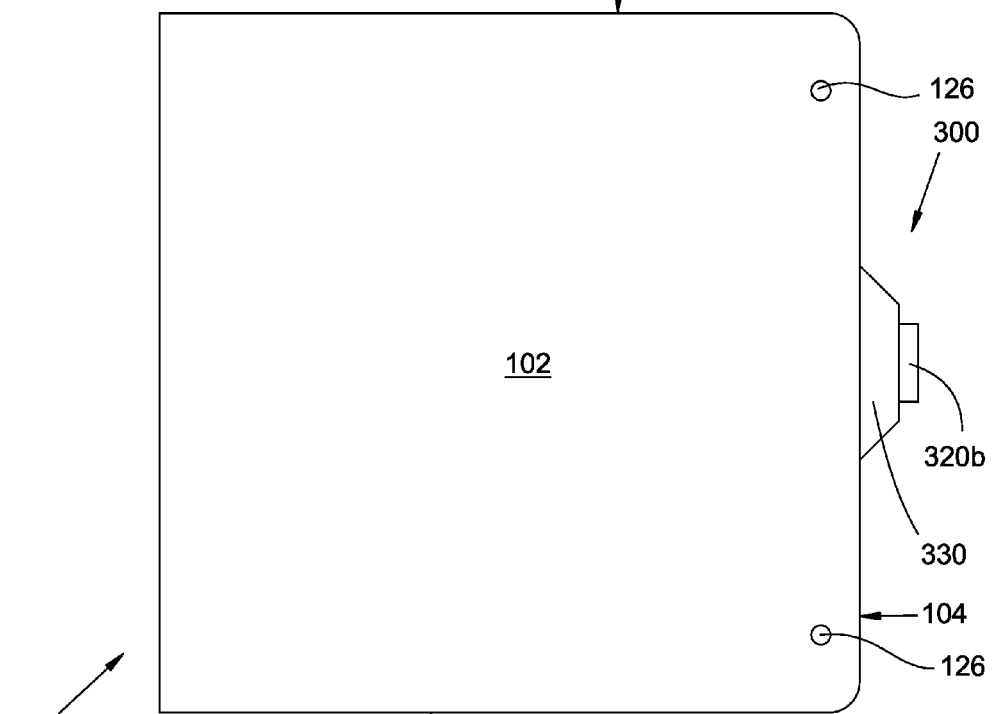
Figure 5G:
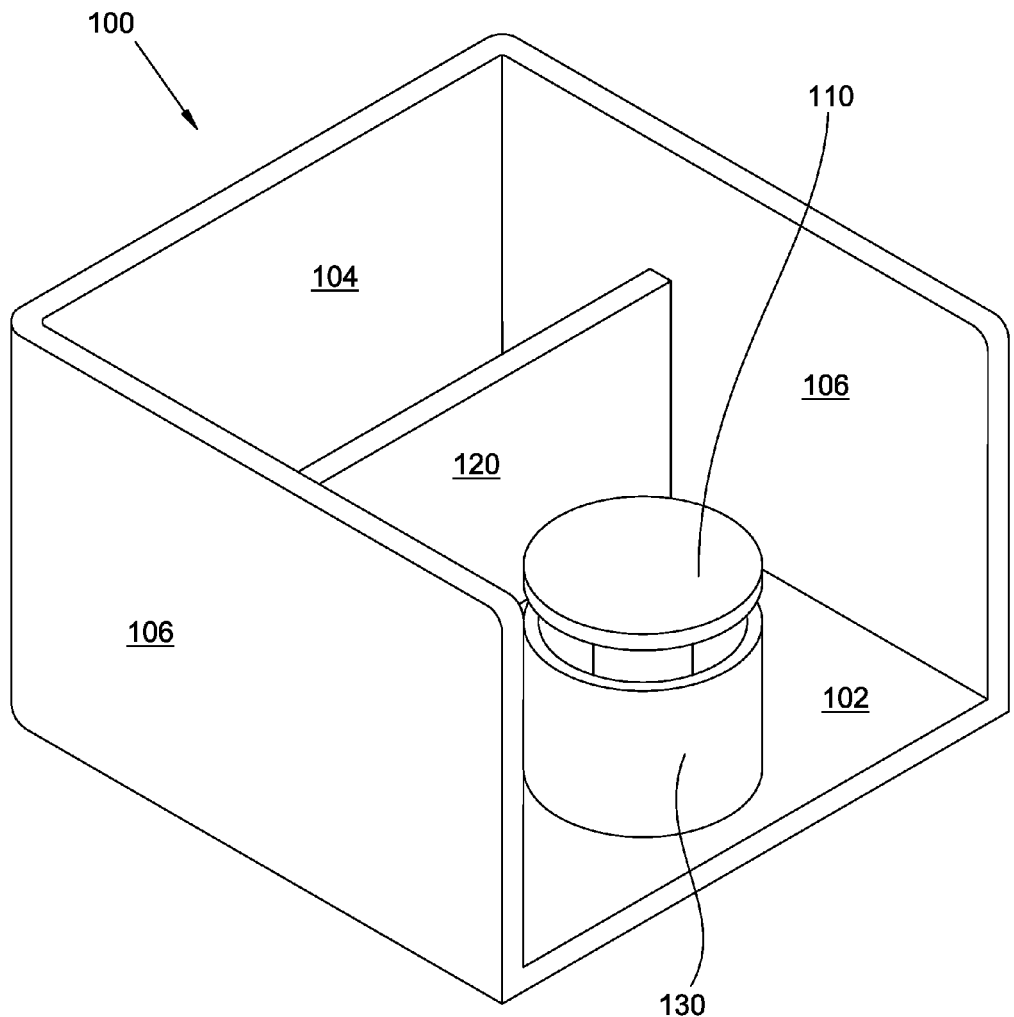
Figure 6A:
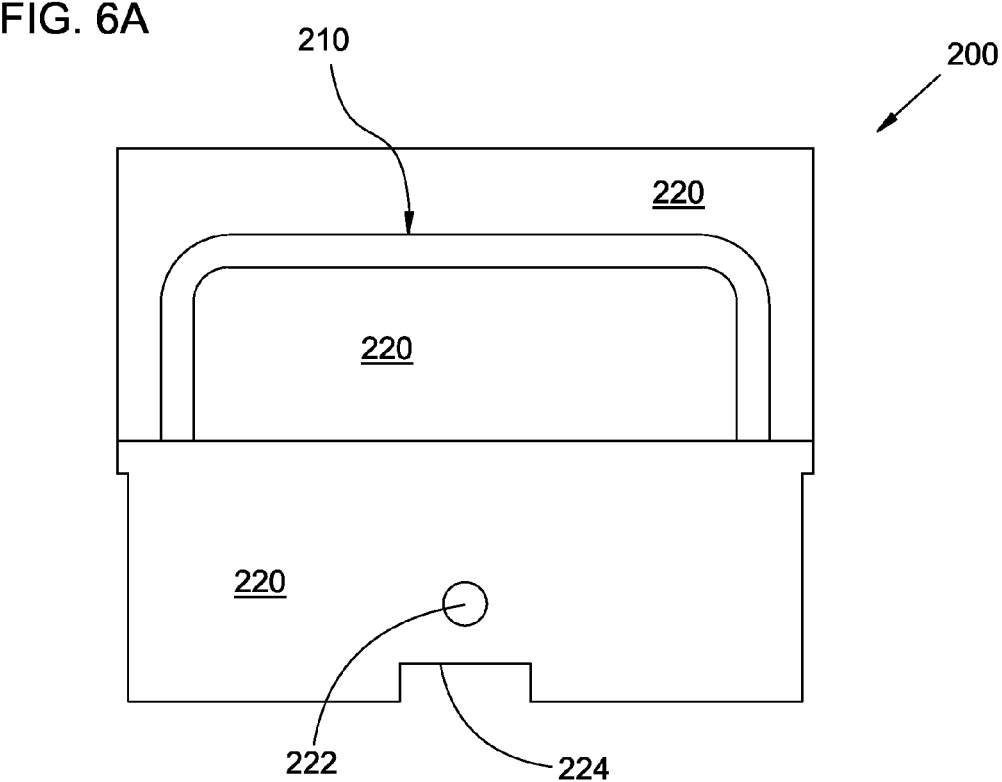
FIGS. 6A-6G are back, front, right side, left side, top, bottom, and isometric views, respectively, of the top cover of the exemplary lockbox.
Figure 6B:
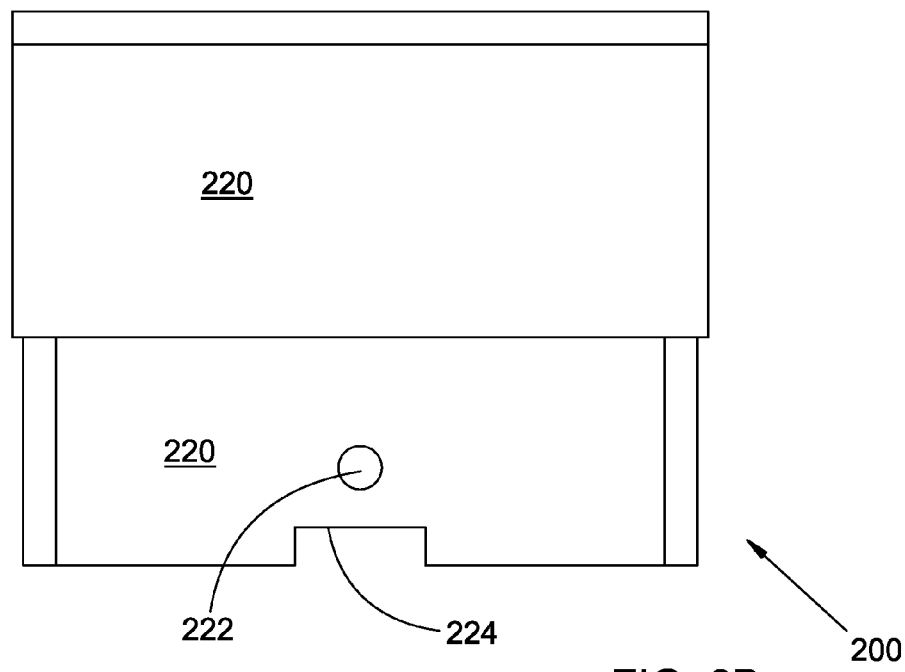
Figure 6C:
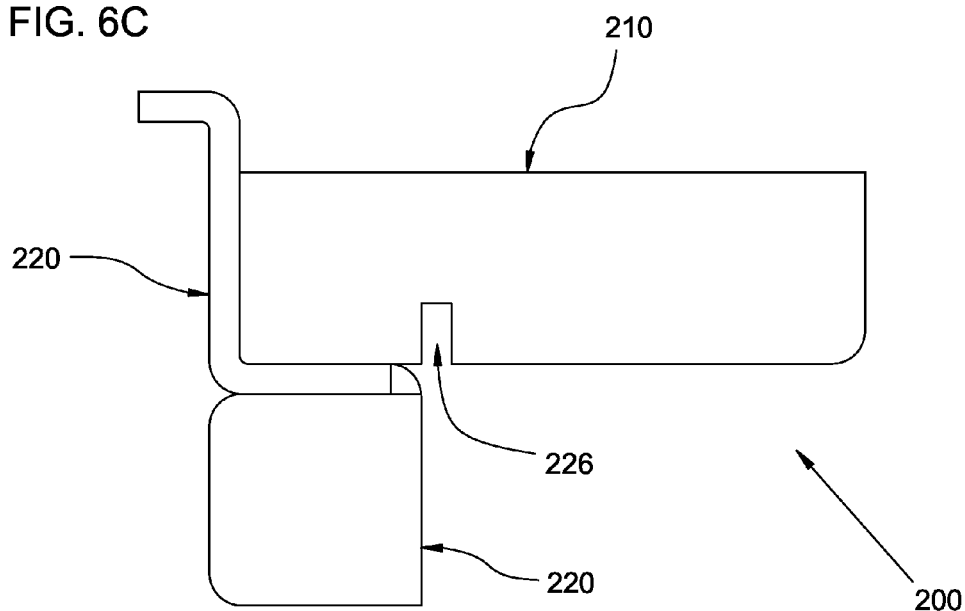
Figure 6D:
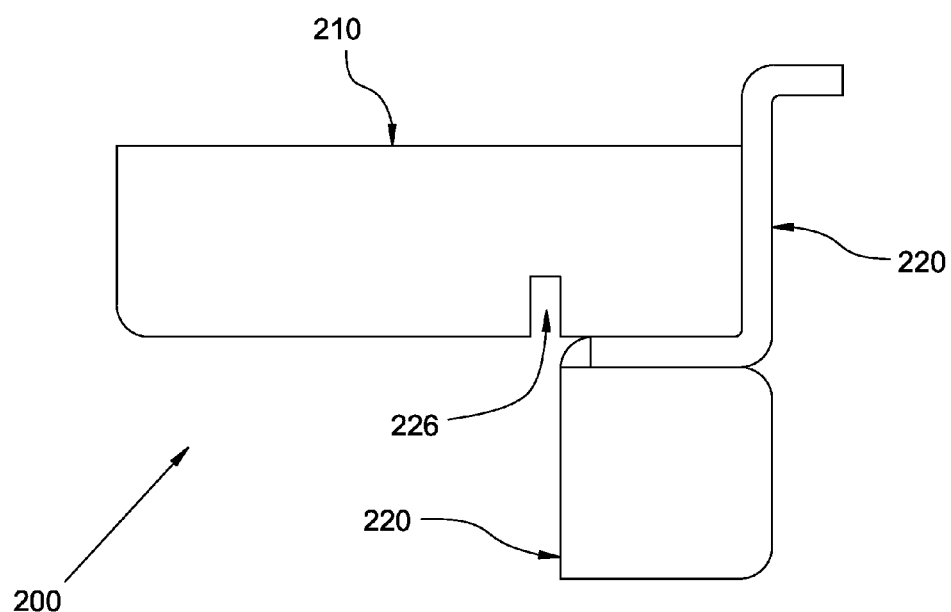
Figure 6E:
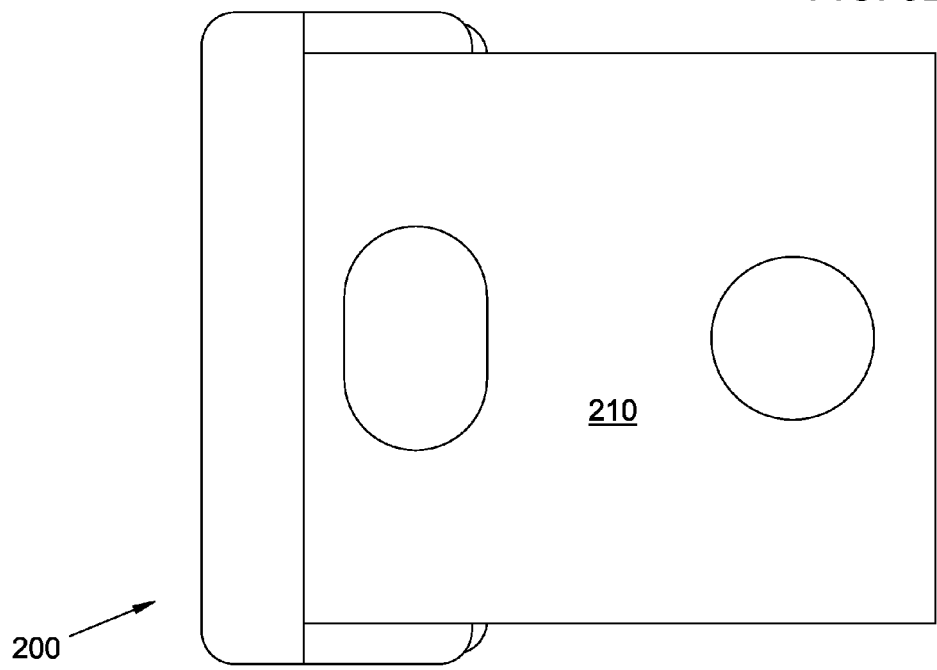
Figure 6F:
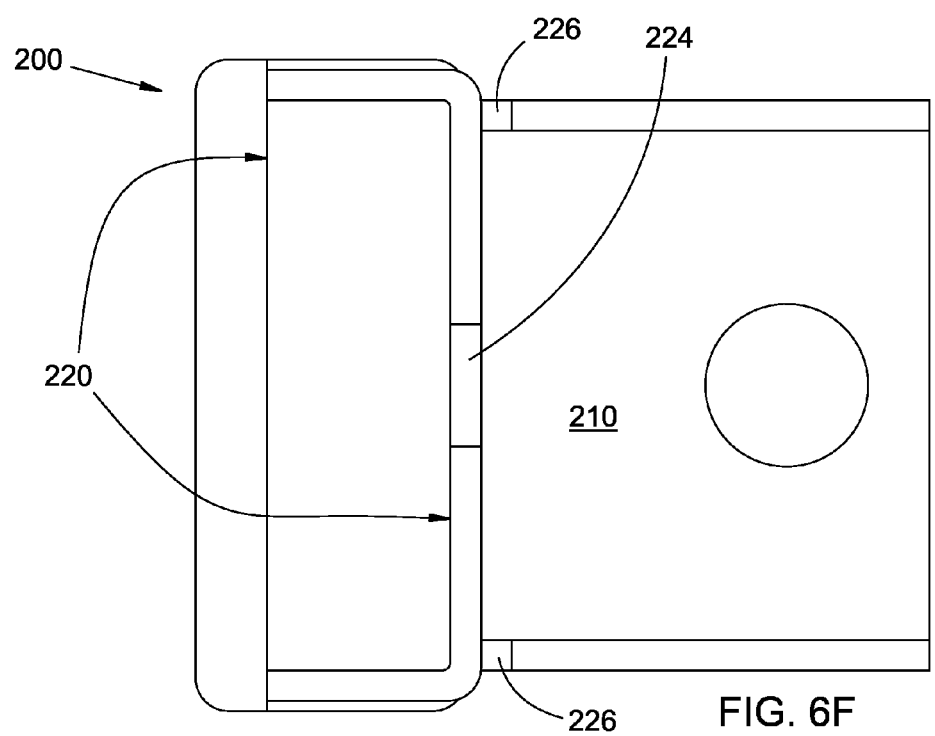
Figure 6G:
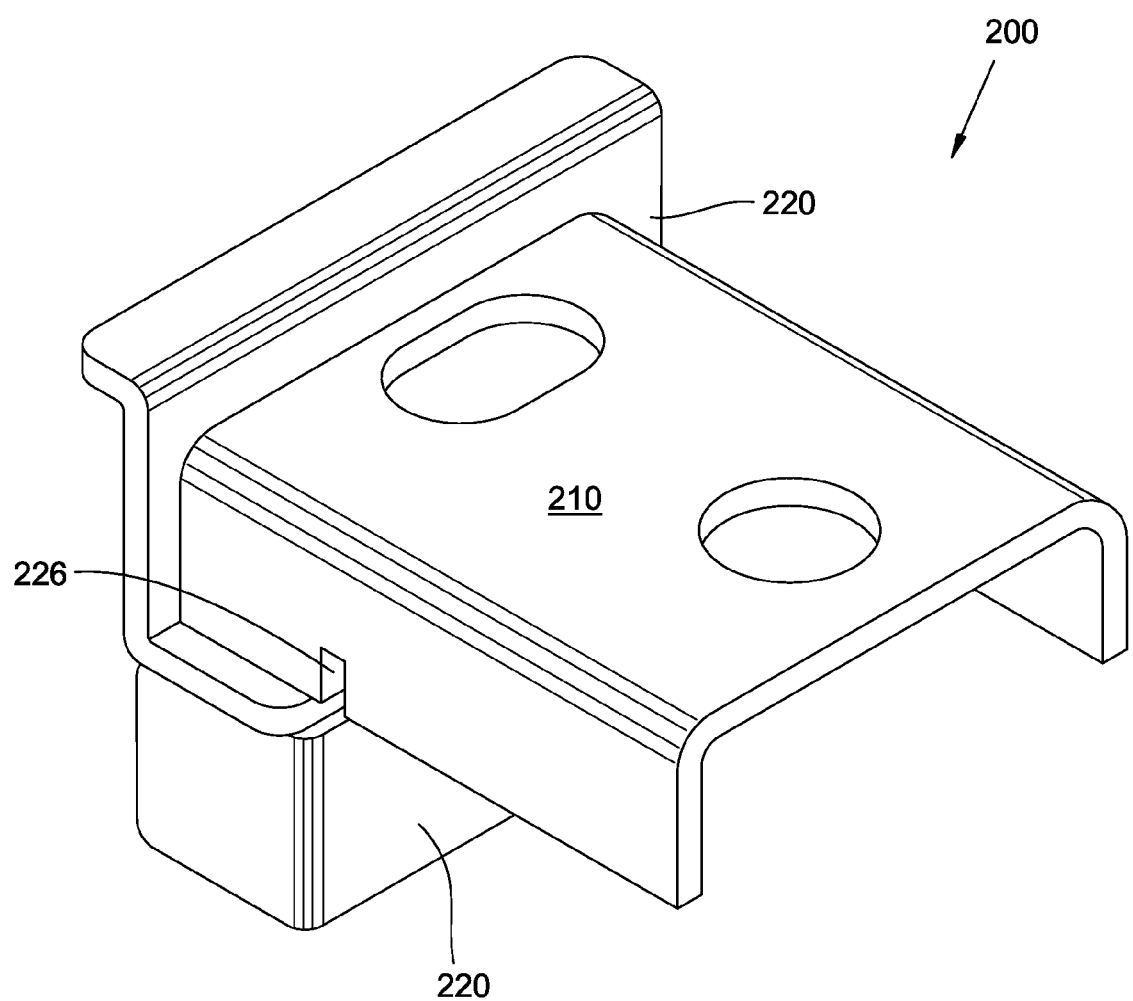

It should be noted that the one or more embodiments depicted in this disclosure may be shown only schematically, and that not all features may be shown in full detail or in proper proportion. Certain features or structures may be exaggerated relative to others for clarity. It should be noted further that the one or more embodiments shown are exemplary only, and should not be construed as limiting the scope of the written description or appended claims.

DETAILED DESCRIPTION OF EMBODIMENTS

FIG. 1 is an exploded view of an exemplary lockbox for a coupler of a trailer. The lockbox comprises a bottom assembly 100, a top cover 200, and a locking mechanism 300. The bottom assembly 100 (e.g., as in FIGS. 2A and 2B) comprises a bottom panel 102, a front panel 104, and two side panels 106 arranged so as to define a lockbox interior volume, an open top area, and an open back area. The bottom assembly 100 further comprises a post 110 mounted on the bottom panel 102 within the interior volume (e.g., as in FIGS. 2A and 2B). The post 110 is arranged to be received into a socket of a coupler 90 of a trailer with the coupler 90 received into the interior volume through the open back area (e.g., as in FIGS. 3A and 3B). The bottom assembly 100 and the top cover 200 are arranged so as to engage one another with the top cover 200 covering at least a portion of the open top area above the post 110 so as to prevent removal of the coupler 90 from the post 110 (e.g., as in FIGS. 4A and 4B). The bottom assembly 100 and the top cover 200 can be fabricated from any suitably strong and rigid one or more materials; one or more metals or metal alloys can be typically employed. Examples of suitable materials can include steel, stainless steel, aluminum, other metal or metal alloy, various plastics, various composite materials (e.g., fibers embedded in a polymer matrix), one or more other suitable materials, or combinations thereof. The bottom assembly 100 and the top cover 200 can comprise the same one or more materials, or can comprise differing materials. The panels 102/104/106 can be integrally formed or can be variously assembled and substantially rigidly connected together (e.g., by welding metal parts); likewise, the top cover can comprise a single, integrally formed piece or multiple assembled and substantially rigidly connected pieces (e.g., welded metal parts).

The locking mechanism 300 is arranged, in a locked configuration (e.g., as in FIGS. 4A and 4B), to retain the bottom assembly 100 and the top cover 200 engaged with one another, thereby preventing removal of the coupler 90 from the post 110 or from the interior volume of the bottom assembly 100. The presence of the lockbox on the coupler 90 with the locking mechanism in its locked configuration prevents access to the socket of the coupler 90, thereby preventing the coupler 90 (and hence the trailer) to be engaged with a trailer hitch of a towing vehicle (in particular, an unauthorized towing vehicle). The locking mechanism 300 is arranged, in an unlocked configuration (e.g., as in FIGS. 2A, 2B, 3A, and 3B), to enable disengagement of the top cover 200 from the bottom assembly 100, thereby enabling removal of the coupler 90 of the trailer from the post 110 and from the interior volume of the bottom assembly 100. An authorized user (e.g., one possessing a hardware key or an alphanumeric combination for the locking mechanism 300) can therefore unlock the locking mechanism 300, disengage the top cover 200 from the bottom assembly 100, and remove the lockbox from the coupler 90, thereby enabling him or her to hitch the trailer to an authorized towing vehicle.

The bottom assembly 100 further comprises a substantially rigid tubular member 130 positioned around a lower portion of the post 110. The tubular member 130 is arranged so as to be rotatable around the post 110 and to obstruct access to the post 110 with the coupler 90 positioned on the post (i.e., with the post 110 received in the socket of the coupler 90). The tubular member 130 enhances the security of the trailer provided by the lockbox by obstructing access to the post 110 and by rotating about the post 110, as described below.

One way in which a would-be thief of the trailer might attempt unauthorized removal of the lockbox would be cutting the post 110 to enable removal of the coupler 90 (and the severed end of the post 110) from the interior volume of the bottom assembly 100. Once removed from the lockbox, the severed end of the post 110 could be readily removed from the coupler 90, and the trailer could be hitched to an unauthorized vehicle and stolen. The tubular member 130 can prevent or hinder significantly such cutting of the post 110 with the coupler 90 in place and the top cover 200 engaged. By obstructing access to the post 110, the tubular member would force the would-be thief to first cut through the tubular member 130 (in place) before attempting to cut the post 110.

The diameter of the tubular member can be made large enough so that a bolt cutter or similar shearing tool could not be easily used, or perhaps could not be used at all given the spatial constraints imposed by the bottom assembly 100 or the top cover 200. Rotation of the tubular member 130 makes cutting it in place with a saw quite difficult, if not impossible. Tangential movement of a saw blade against the outside surface of the tubular member would tend to rotate the tubular member 130 around the post 110 instead of cutting into it. Even if the would-be thief somehow manages to cut through the tubular member 130 to reach the post 110, the saw blade would still be in the groove it cut through the tubular member 130; the tubular member 130 would thus continue to interfere with the attempt to cut the post 110. The tubular member can be formed from any suitably strong and rigid one or more materials; one or more metals or metal alloys can be typically employed. Examples of suitable materials can include steel, stainless steel, aluminum, other metal or metal alloy, various plastics, various composite materials (e.g., fibers embedded in a polymer matrix), one or more other suitable materials, or combinations thereof.

The post 110 can be arranged or formed in any suitable way and can comprise any suitably strong and rigid material. The post 110 can be integrally formed on the bottom panel 102 of the bottom assembly 100 (in which case the bottom "assembly" 100 may in fact comprise only a single, integrally formed piece), or more typically comprises a discrete component assembled with the bottom panel 102. The post 110 can resemble a standard hitch ball, or can take any other form suitable for being received within the socket of the coupler 90. In the exemplary embodiment shown in the drawings, the post 110 comprises a threaded fastener that includes a head and a threaded portion. The head of the threaded post 110 is received within the socket of the coupler 90 when the coupler is positioned on the post 110; the threaded portion engages a mating threaded member 112 on the bottom panel 102. The threaded member can be integrally formed with the bottom panel 102 or can comprise a discrete part that is substantially rigidly attached to the bottom panel 102; a common arrangement includes a metal threaded nut 112 welded to the bottom panel 102. The threaded engagement of the post 110 with the bottom panel 102 enables adjustment of the height of the post 110 to accommodate couplers of various sizes between the post 110 and the engaged top cover 200. Such a threaded post 110 can be removed completely from the bottom panel 102 and replaced, in some instances with a different threaded post 110 of a different height. Use of such interchangeable post heights can enable the lockbox to be used on a wider variety of trailer couplers. In some instances it can be advantageous for the threaded hole on the bottom panel 102 to be a blind hole, therefore not accessible from outside the lockbox, to enhance the security of the lockbox.

Any suitable arrangement of the bottom assembly 100, the top cover 200, and the locking mechanism 300 can be employed for enabling engagement of the top cover 200 with the bottom assembly 100 and retention of the bottom assembly 100 and the top cover 200 engaged with one another by the locking mechanism 300.

Figure 7G:
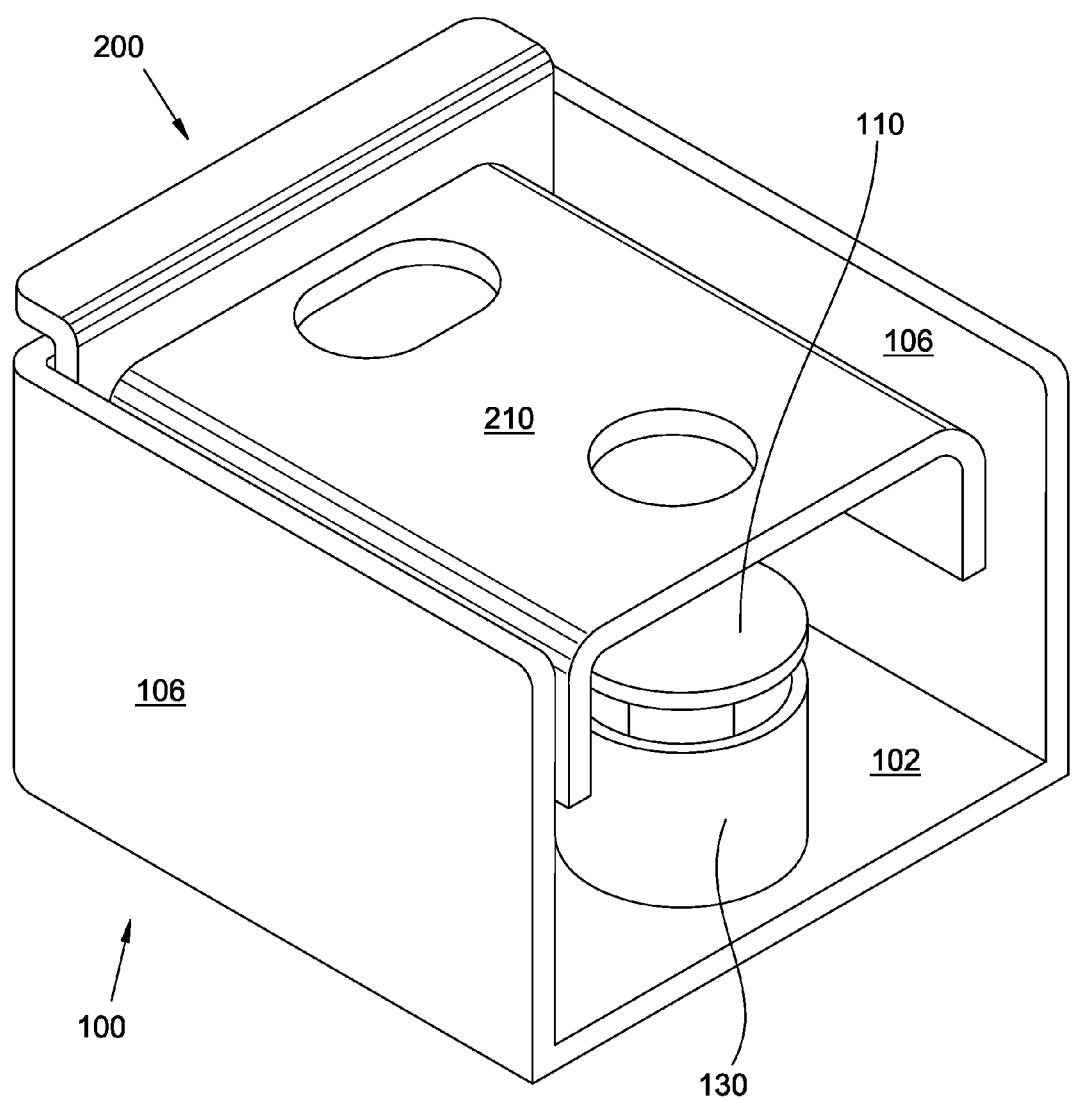

In some exemplary embodiments, the bottom assembly 100 can include a transverse partition 120 that divides the interior volume into front and back portions, and the top cover 200 can include a top panel 210 and a front panel 220. In some of those exemplary embodiments, the top cover 200 can include one or more slots 226 for receiving an upper edge of the transverse partition 120. In exemplary embodiments having a transverse partition 120 and a front panel 220, the front panel 220 of the top cover 200 can be received within the front portion of the interior volume when the bottom assembly 100 and the top cover 200 are engaged with one another (e.g., as in FIGS. 4A and 4B). In some of those exemplary embodiments the locking mechanism 300 can include a rod 310 positioned, with the locking mechanism 300 in the locked configuration, in a hole through the front panel 102 of the bottom assembly 100 and in a hole 222 through the front panel 220 of the top cover 200; those holes are substantially aligned with one another when the bottom assembly 100 and the top cover 200 are engaged with one another (e.g., as in FIGS. 4A, 4B, and 7A-7G). The presence of the rod 310 extending through holes in both the bottom assembly 100 and the top cover 200 retains the top cover 200 engaged with the bottom assembly 100 and prevents removal of the top cover 200 without unlocking the mechanism 300. In some instances, the rod 310 can further extend (with the locking mechanism 300 in the locked configuration, e.g., as in FIGS. 4A and 4B) into a hole 122 in the transverse partition 120, providing additional structural support for the rod 310 when in the locked configuration. In those instances, the hole 122 can extend through the transverse partition 120 and therefore be open to both front and back portions of the interior volume, or can be a blind hole open to only the front portion of the interior volume; that latter arrangement can prevent unauthorized access to the rod 310 in the locked configuration, enhancing the security provided by the lockbox.

One example of a suitable locking mechanism includes inner lock cylinder 320b reciprocally moveable within an outer lock cylinder 320a. The outer lock cylinder 320a is substantially rigidly connected to the front panel 104 of the bottom assembly 100 and extends through a hole in the front panel 104. The rod 310 is substantially rigidly connected to the inner lock cylinder 320b. The inner locking cylinder 320b moves within the outer lock cylinder 320a between the locked and unlocked configurations. A suitable hardware key or alphanumeric combination can be employed to enable movement of the inner lock cylinder 320b from the locked configuration to the unlocked configuration; such a key of combinations may or may not be required for movement from the unlocked configuration to the locked configuration. In some instances the locking mechanism 300 can include a frustoconical flange 330 secured to an outer surface of the front panel 104 of the bottom assembly 100. Such a flange can prevent or hinder unauthorized tampering with the locking mechanism 300 from outside the lockbox.

The bottom assembly 100 or the top cover 200 can include one or more optional features to allow drainage of water from the lockbox. Water accumulation can occur when the lockbox is deployed outdoors, for example. In the exemplary embodiment shown in the drawings, the bottom assembly 100 includes drainage holes 126 through the bottom panel 102 and a slot 124 through the transverse partition 120. In the exemplary embodiment shown in the drawings, the top cover 200 includes a notch 224 on the bottom edge of the front panel 220 that substantially aligns with the slot 124 when the top cover 200 is engaged with the bottom assembly 100 (e.g., as shown in FIG. 4B). Several optional holes are shown in the top panel 210 of the top cover 200; such holes can be present to reduce weight of the lockbox, or to provide a place for grasping the top cover 200 to remove it from the bottom assembly 100.

In addition to the preceding, the following examples fall within the scope of the present disclosure or appended claims:

Example 1

A lockbox for a coupler of a trailer, the lockbox comprising a bottom assembly, a top cover, and a locking mechanism, wherein: (a) the bottom assembly comprises a bottom panel, a front panel, and two side panels arranged so as to define a lockbox interior volume, an open top area, and an open back area; (b) the bottom assembly further comprises a post mounted on the bottom panel within the interior volume, which post is arranged to be received into a socket of the coupler of the trailer with the coupler received into the interior volume through the open back area; (c) the bottom assembly and the top cover are arranged so as to engage one another with the top cover covering at least a portion of the open top area above the post so as to prevent removal of the coupler from the post; (d) the locking mechanism is arranged, in a locked configuration, to retain the bottom assembly and the top cover engaged with one another, and arranged in an unlocked configuration to enable disengagement of the top cover from the bottom assembly; and (e) the bottom assembly further comprises a substantially rigid tubular member positioned around a lower portion of the post and arranged so as to be rotatable around the post and to obstruct access to the post with the post received in the socket of the coupler of the trailer.

Example 2

The lockbox of Example 1 wherein the post comprises a trailer hitch ball.

Example 3

The lockbox of any preceding Example wherein the post is threadedly engaged with the bottom panel so as to enable adjustment of a height of the post.

Example 4

The lockbox of any preceding Example wherein the post is arranged to be removed from and reattached to the bottom assembly.

Example 5

The lockbox of any preceding Example wherein: (f) the bottom assembly further comprises a transverse partition that divides the interior volume into front and back portions; (g) the top cover includes a top panel and a front panel; and (h) the front panel of the top cover is received within the front portion of the interior volume when the bottom assembly and the top cover are engaged with one another.

Example 6

The lockbox of Example 5 wherein the locking mechanism is secured to the front panel of the bottom assembly and includes a rod positioned, with the locking mechanism in the locked configuration, in a hole through the front panel of the top cover that is aligned with the rod when the bottom assembly and the top cover are engaged with one another, and the rod thus positioned retains the bottom assembly and the top cover engaged with one another.

Example 7

The lockbox of Example 6 wherein the rod, with the locking mechanism in the locked configuration, is positioned in a hole in the transverse partition.

Example 8

The lockbox of Example 6 wherein the locking mechanism further comprises a frustoconical flange secured to an outer surface of the front panel of the bottom assembly.

It is intended that equivalents of the one or more disclosed exemplary embodiments or methods shall fall within the scope of the present disclosure or appended claims. It is intended that the one or more disclosed exemplary embodiments or methods, or equivalents thereof, may be modified while remaining within the scope of the present disclosure or appended claims.

In the foregoing Detailed Description, various features may be grouped together in one or more exemplary embodiments for the purpose of streamlining the disclosure. This method of disclosure is not to be interpreted as reflecting an intention that any claimed embodiment requires more features than are expressly recited in a corresponding claim. Rather, as the appended claims reflect, inventive subject matter may lie in less than all features of a single disclosed exemplary embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., sets of features that are not incompatible or mutually exclusive) that appear in the present disclosure or the appended claims, including those sets that may not be explicitly disclosed herein. It should be further noted that the scope of the appended claims do not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof, wherever they appear, shall be construed as open ended terminology, with the same meaning as if the phrase "at least" were appended after each instance thereof.

In the appended claims, if the provisions of 35 USC §112 ¶ 6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112 ¶ 6 are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A lockbox for a coupler of a trailer, the lockbox comprising a bottom assembly, a top cover, and a locking mechanism, wherein:
    (a) the bottom assembly comprises a bottom panel, a front panel, and two side panels arranged so as to define a lockbox interior volume, an open top area, and an open back area;
    (b) the bottom assembly further comprises a post mounted on the bottom panel within the interior volume, which post is arranged to be received into a socket of the coupler of the trailer with the coupler received into the interior volume through the open back area;
    (c) the bottom assembly and the top cover are arranged so as to engage one another with the top cover covering at least a portion of the open top area above the post so as to prevent removal of the coupler from the post;
    (d) the locking mechanism is arranged, in a locked configuration, to retain the bottom assembly and the top cover engaged with one another, and arranged in an unlocked configuration to enable disengagement of the top cover from the bottom assembly; and
    (e) the bottom assembly further comprises a substantially rigid tubular member positioned around a lower portion of the post and arranged so as to be rotatable around the post and to obstruct access to the post with the post received in the socket of the coupler of the trailer.

2. The lockbox of claim 1 wherein the post comprises a trailer hitch ball.

3. The lockbox of claim 1 wherein the post is threadedly engaged with the bottom panel so as to enable adjustment of a height of the post.

4. The lockbox of claim 1 wherein the post is arranged to be removed from and reattached to the bottom assembly.

5. The lockbox of claim 1 wherein:
    (f) the bottom assembly further comprises a transverse partition that divides the interior volume into front and back portions;
    (g) the top cover includes a top panel and a front panel; and
    (h) the front panel of the top cover is received within the front portion of the interior volume when the bottom assembly and the top cover are engaged with one another.

6. The lockbox of claim 5 wherein the locking mechanism is secured to the front panel of the bottom assembly and includes a rod positioned, with the locking mechanism in the locked configuration, in a hole through the front panel of the top cover that is aligned with the rod when the bottom assembly and the top cover are engaged with one another, and the rod thus positioned retains the bottom assembly and the top cover engaged with one another.

7. The lockbox of claim 6 wherein the rod, with the locking mechanism in the locked configuration, is positioned in a hole in the transverse partition.

8. The lockbox of claim 6 wherein the locking mechanism further comprises a frustoconical flange secured to an outer surface of the front panel of the bottom assembly.

* * * * *